(12) United States Patent
Valeri et al.

(10) Patent No.: US 9,326,087 B2
(45) Date of Patent: Apr. 26, 2016

(54) SOUND AUGMENTATION SYSTEM PERFORMANCE HEALTH MONITORING

(71) Applicant: GM GLOBAL TECHNOLOGY OPERATIONS LLC, Detroit, MI (US)

(72) Inventors: Frank C. Valeri, Novi, MI (US); Scott M. Reilly, Southfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 123 days.

(21) Appl. No.: 14/203,625

(22) Filed: Mar. 11, 2014

(65) Prior Publication Data

US 2015/0264499 A1 Sep. 17, 2015

(51) Int. Cl.
| | |
|---|---|
| *H04S 7/00* | (2006.01) |
| *H04R 3/02* | (2006.01) |
| *H04R 29/00* | (2006.01) |
| *G10K 11/178* | (2006.01) |
| *H04R 3/00* | (2006.01) |
| *H04R 3/04* | (2006.01) |
| *H04R 3/12* | (2006.01) |

(52) U.S. Cl.
CPC *H04S 7/302* (2013.01); *H04R 3/02* (2013.01); *G10K 11/178* (2013.01); *H04R 3/005* (2013.01); *H04R 3/04* (2013.01); *H04R 3/12* (2013.01); *H04R 29/001* (2013.01); *H04R 29/004* (2013.01); *H04R 2499/13* (2013.01)

(58) Field of Classification Search
CPC ........ H04R 29/00; H04R 29/001; H04R 3/02; H04S 7/302
See application file for complete search history.

(56) References Cited

U.S. PATENT DOCUMENTS

| | | | | |
|---|---|---|---|---|
| 2009/0086990 A1* | 4/2009 | Christoph | ............... | H04R 3/04 381/71.12 |
| 2010/0014685 A1* | 1/2010 | Wurm | ................. | G10K 11/178 381/71.11 |

\* cited by examiner

*Primary Examiner* — Sonia Gay
(74) *Attorney, Agent, or Firm* — Cantor Colburn LLP

(57) ABSTRACT

A vehicle system is provided that includes a sound augmentation system with a sound augmentation generator that produces an augmented audio output to drive at least one audio output based on a transfer function and a plurality of audio tuning parameters. The vehicle system also includes a sound augmentation system health monitor that compares a feedback of the augmented audio output to a level of at least one input relative to at least one environmental condition to determine a current performance level of the sound augmentation system. The sound augmentation system health monitor also determines a difference between the current performance level of the sound augmentation system and at least one performance threshold level, and initiates an alert upon determining that the difference is at a predetermined level.

15 Claims, 4 Drawing Sheets

SOUND AUGMENTATION SYSTEM PERFORMANCE HEALTH MONITORING

FIELD OF THE INVENTION

Exemplary embodiments of the invention are related to systems and methods for health monitoring of sound augmentation system performance.

BACKGROUND

To enhance driver and passenger experience, some vehicles include a sound augmentation system, such as an active noise cancellation system, sound masking system, or a sound enhancement system. An active noise cancellation system attempts to reduce or eliminate unwanted sound by the addition of another sound source specifically designed to cancel or substantially reduce the unwanted sound. A sound masking system adds sound to cover up an unwanted sound by making it more difficult to distinguish the unwanted sounds from the additional sound. A sound enhancement system can add sounds to enhance perceived performance characteristics, such as making an automobile engine sound more powerful or more refined from a vehicle occupant perspective.

A sound augmentation system in a vehicle may include one or more microphones to detect sounds, vehicle information inputs to determine a current state of the vehicle, an amplifier, and one or more speakers to output augmented sounds. As components age they may exhibit degraded performance. Degradation or changes in the sound characteristics of the sound augmentation system or of components that emit sounds to be augmented can result in noticeable changes in the audio environment within the vehicle. For instance, if the sound augmentation system becomes inoperative, the vehicle occupants may notice that the vehicle sounds different but not understand why.

Accordingly, it is desirable to provide systems and methods for health monitoring of sound augmentation system performance.

SUMMARY OF THE INVENTION

In one exemplary embodiment, a vehicle system is provided that includes a sound augmentation system with a sound augmentation generator coupled to at least one audio output. The sound augmentation generator produces an augmented audio output to drive the at least one audio output based on a transfer function and a plurality of audio tuning parameters. The vehicle system also includes a sound augmentation system health monitor coupled to at least one input and a feedback of the augmented audio output. The sound augmentation system health monitor compares the feedback of the augmented audio output to a level of the at least one input relative to at least one environmental condition to determine a current performance level of the sound augmentation system. The sound augmentation system health monitor also compares the current performance level of the sound augmentation system to at least one performance threshold level, and initiates an alert upon determining that the difference is at a predetermined level.

In another exemplary embodiment, a method of sound augmentation system performance health monitoring in a vehicle is provided. A sound augmentation generator of a sound augmentation system produces an augmented audio output to drive at least one audio output in the vehicle based on a transfer function and a plurality of audio tuning parameters. A feedback of the augmented audio output is compared to a level of at least one input relative to at least one environmental condition to determine a current performance level of the sound augmentation system. A difference is determined between the current performance level of the sound augmentation system and at least one performance threshold level. An alert is initiated upon determining that the difference is at a predetermined level.

In a further exemplary embodiment, a vehicle includes at least one audio output, at least one input, a sound augmentation system, and a sound augmentation system health monitor. The at least one input includes one or more of: at least one audio input from one or more microphones and at least one feedback of the at least one audio output from one or more speakers. The sound augmentation system includes a sound augmentation generator coupled to the at least one audio output. The sound augmentation generator produces an augmented audio output to drive the at least one audio output based on a transfer function and a plurality of audio tuning parameters. The sound augmentation system health monitor is coupled to the at least one input and a feedback of the augmented audio output. The sound augmentation system health monitor compares the feedback of the augmented audio output to a level of the at least one input relative to at least one vehicle condition to determine a current performance level of the sound augmentation system. The sound augmentation system also determines a difference between the current performance level of the sound augmentation system and at least one performance threshold level, and initiates an alert upon determining that the difference is at a predetermined level.

The above features and advantages and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
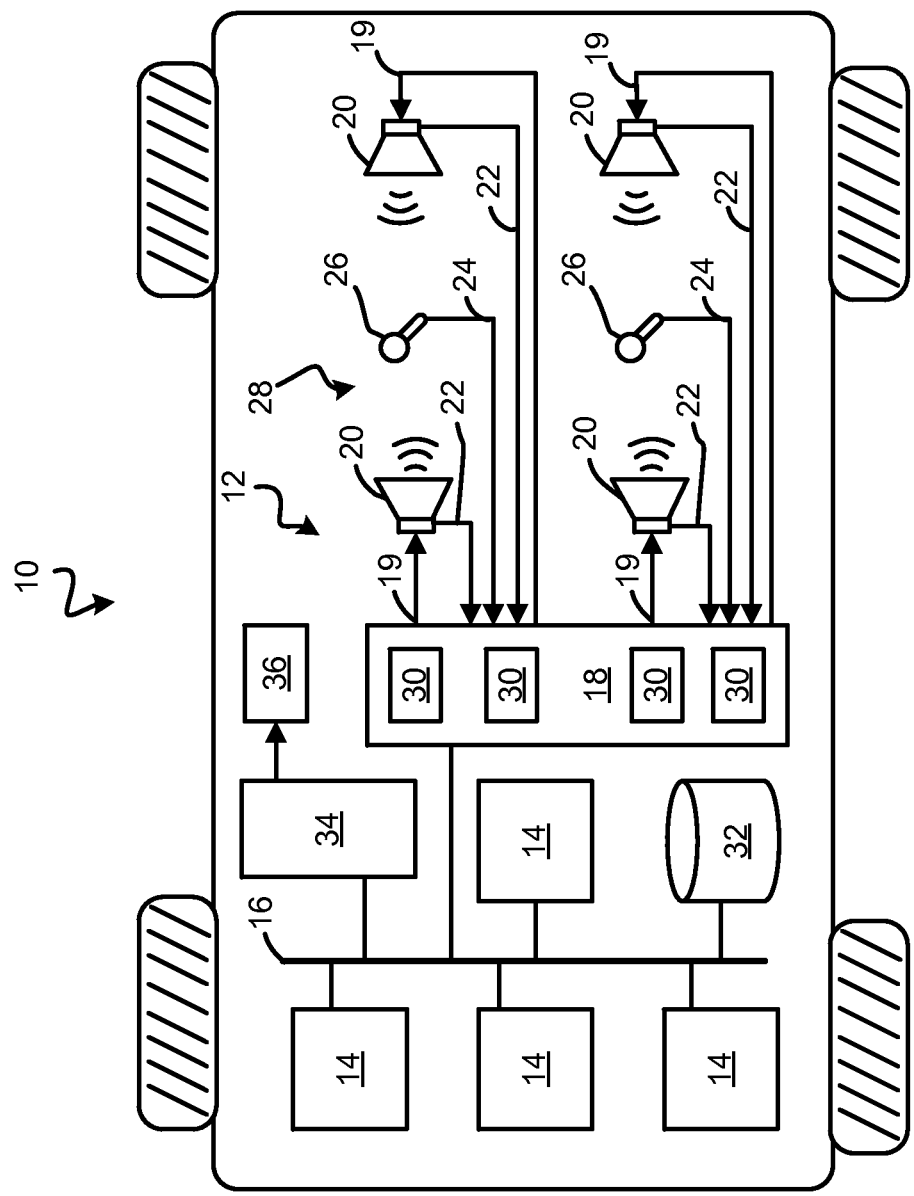
FIG. 1 is a schematic illustration of a vehicle including a system configured to perform sound augmentation in accordance with an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment of the invention a vehicle is shown generally at 10 in FIG. 1. The vehicle 10 includes a vehicle system 12, which is also referred to as system 12. The vehicle system 12 includes a plurality of modules 14 coupled to a vehicle information bus 16. The modules 14 may support a number of specific functions for the vehicle 10, such as an engine control module, a transmission control unit, an anti-lock braking system, and body control modules for example. In the example of FIG. 1, the vehicle system 12 also includes an audio system 18 configured to perform sound augmentation.

The audio system 18, also referred to generally as system 18, drives at least one audio output 19 to one or more speakers 20. In the example of FIG. 1, the audio system 18 drives four audio outputs 19 to four speakers 20; however, it will be understood that there could be any number of speakers 20 in various distribution patterns in the vehicle 10. The audio system 18 may receive four audio output feedbacks 22 from the four speakers 20. The audio system 18 is also coupled to at least one audio input 24 from one or more microphones 26. In the example of FIG. 1, the audio system 18 receives two audio inputs 24 from two microphones 26, where each microphone 26 can be positioned proximate to a pair of the speakers 20 within the vehicle 10. A pairing 28 can be defined between one of the audio outputs 19 or speakers 20 and one of the audio inputs 24 or microphones 26. Each pairing 28 can be associated with a transfer function 30 that characterizes a relationship between the pairing 28 across a frequency range. Individual instances of the transfer function 30 can vary relative to each other based on placement of the speakers 20 and microphones 26 within the vehicle 10 as well as individual characteristics of each pairing 28 and the particular configuration of the vehicle 10. The transfer functions 30 and associated configuration data can initially reside in a data storage device 32, which may be incorporated within the audio system 18 or otherwise in communication with the audio system 18. In the example of FIG. 1, the data storage device 32 is coupled to the audio system 18 through the vehicle information bus 16. The audio system 18 may read and/or update data stored in the data storage device 32.

The audio system 18 can send and receive a variety of data on the vehicle information bus 16. The audio system 18 may receive data including vehicle conditions from one or more of the modules 14, indicating operating conditions of the vehicle 10. The vehicle conditions may also be referred to generally as environmental conditions, as the vehicle conditions can be used to infer likely sources contributing to an overall audio environment of the vehicle 10. In alternate embodiments, vehicle conditions are received at the audio system 18 from one or more direct connections (not depicted) with one or more of the modules 14. The audio system 18 can generate outputs on the vehicle information bus 16, such as alerts, to indicate when an undesired condition is detected or an adjustment has been performed. Alerts can be sent from the audio system 18 to a vehicle health monitor 34, which also collects vehicle health data from the modules 14. The vehicle health monitor 34 can be coupled to a user interface 36 to display status messages and/or provide an interactive health and diagnostic service interface for the vehicle 10.

Although a particular arrangement is depicted within the vehicle 10, the scope of embodiments is not so limited. For example, various orientation and distribution patterns of the pairings 28 can be used in the vehicle 10, as well as various numbers of speakers 20 and microphones 26 with associated inputs and outputs. Furthermore, the audio system 18 can be subdivided into multiple systems or integrated within another component or system. In embodiments where only feed-forward sound augmentation is performed, the microphones 26 and audio inputs 24 can be omitted, and the audio output feedbacks 22 can be used as one or more inputs for sound augmentation system health monitoring. In embodiments where only feedback sound augmentation is performed, the microphones 26 and audio inputs 24 can be used as one or more inputs for sound augmentation system health monitoring. In embodiments where both feed-forward and feedback sound augmentation are performed, the audio inputs 24 and the audio output feedbacks 22 can be used as inputs for sound augmentation system health monitoring.

Figure 2:
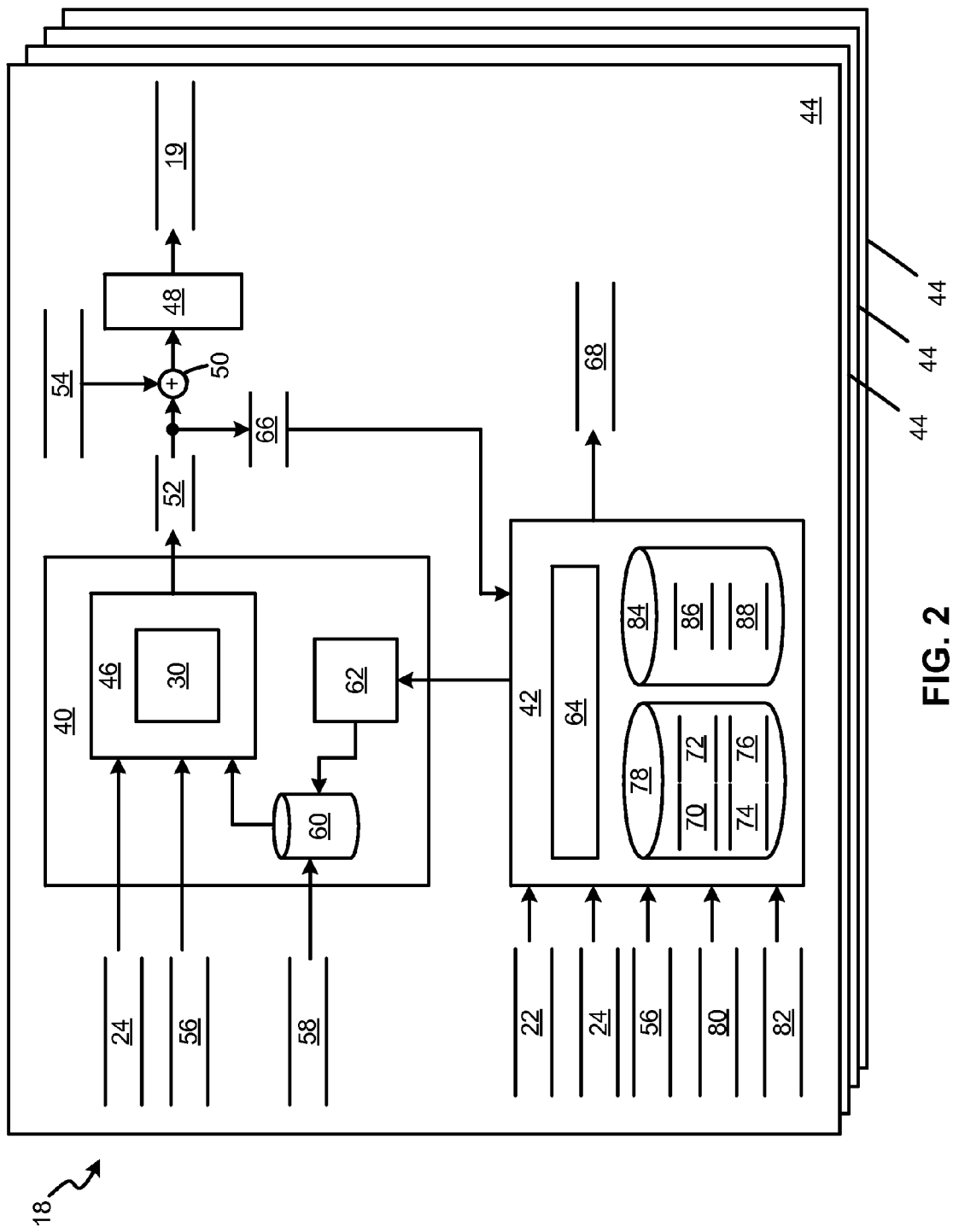
FIG. 2 is a dataflow diagram for a portion of the system of FIG. 1 in accordance with an exemplary embodiment.

FIG. 2 is a dataflow diagram of a portion of the audio system 18 of FIG. 1 in accordance with an exemplary embodiment. In the example of FIG. 2, a sound augmentation system 40 and a sound augmentation health monitor 42 are depicted in greater detail for one audio channel 44. In the example of FIG. 2, there are four audio channels 44, where each audio channel 44 drives an associated speaker 20 of FIG. 1. The sound augmentation system 40 includes a sound augmentation generator 46 coupled to at least one audio output 19. As depicted in FIG. 2, the sound augmentation generator 46 may be coupled to an audio output 19 through an amplifier 48 and a summing junction 50. The summing junction 50 can combine an augmented audio output 52 produced by the sound augmentation generator 46 with a baseline audio output 54 of the audio system 18. For example, the baseline audio output 54 can be from a radio tuner, a compact disc player, a navigation system, an auxiliary source, another augmentation source, or the like.

The sound augmentation generator 46 produces the augmented audio output 52 to drive the at least one audio output 19 based on the transfer function 30, one or more environmental conditions 56, and a plurality of audio tuning parameters 58. As previously described in reference to FIG. 1, the environmental conditions 56 may be vehicle conditions that are received from one or more of the modules 14 of FIG. 1. As examples, the environmental conditions 56 can include an engine speed, an engine torque, a gear state, a torque converter slip, an odometer value, a time reference, an engine order, a vehicle speed, and other vehicle and/or environmental conditions known in the art. The audio tuning parameters 58 may be received from the data storage device 32 of FIG. 1 as initial tuning states for the vehicle 10. The audio tuning parameters 58 can be locally buffered and adjusted as learned audio tuning parameters 60. In one embodiment, an adjustment module 62 can adjust the learned audio tuning parameters 60 to modify, for instance, gain and phase values for the augmented audio output 52.

The sound augmentation generator 46 can perform one or more type of sound augmentation. For example, the sound augmentation generator 46 can provide active noise cancellation by driving the augmented audio output 52 into an aligned gain and opposite phase relationship as a targeted noise frequency to cancel. In an active noise cancellation configuration, the sound augmentation generator 46 can establish a feedback loop relative to an audio input 24. One or more of the environmental conditions 56 can be used to determine when the augmented audio output 52 should be enabled (e.g., an engine speed range) and to select values from the learned audio tuning parameters 60 associated with the one or more environmental conditions 56. The transfer function 30 can determine an overall shape of a frequency response relative to the audio input 24 and audio output 19 when the baseline audio output 54 is excluded. In a feed-forward configuration, the sound augmentation generator 46 need not monitor the audio input 24, and the audio input 24 may be omitted. Examples of feed-forward configurations can include sound masking or sound enhancement by adding tones to hide or blend with other sounds rather than attempting to eliminate a targeted noise. In feed-forward configurations, the environmental conditions 56 (e.g., engine speed and torque) can also be used to determine when the augmented audio output 52 should be enabled and to select values from the learned audio tuning parameters 60 associated with one or more of the environmental conditions 56.

The sound augmentation health monitor 42 may include monitoring logic 64 that can initiate the adjustment module 62 to adjust the learned audio tuning parameters 60 based on a number of factors. As can be seen in FIG. 2, the sound augmentation health monitor 42 is coupled to at least one audio input 24 and a feedback 66 of the augmented audio output 52. The feedback 66 of the augmented audio output 52 is based on the augmented audio output 52 but need not be the exact value of the augmented audio output 52. For example, although depicted in FIG. 2 as a direct connection with the augmented audio output 52, in an alternate embodiment the feedback 66 can be captured at any downstream point from the augmented audio output 52, such as prior to or after the amplifier 48. The sound augmentation system health monitor 42 may also receive an audio output feedback 22 as a separate input. As can be appreciated, more feedback signals, such as separate instances of the feedback 66 and the audio output feedback 22 taken at different points may further enhance fault isolation.

The sound augmentation health monitor 42 may perform open circuit and short circuit tests for the speaker 20, microphone 26, and amplifier 48 as higher-level tests. If these higher-level tests are successful, then performance monitoring can be performed. Otherwise, if one or more of the open or short circuit tests have undesired results, an alert 68 can be triggered and sent to the vehicle health monitor 34 of FIG. 1. In an exemplary embodiment, the sound augmentation system health monitor 42 compares the feedback 66 of the augmented audio output 52 to a level of the audio input 24 relative to one or more environmental conditions 56 to determine a current performance level 70 of the sound augmentation system 40. Tracking the current performance level 70 relative to one or more environmental conditions 56 enables the development and use of more precise boundary maps 72 that can consider contributions of multiple components or systems of the vehicle 10 of FIG. 1. The sound augmentation system health monitor 42 can determine a difference between the current performance level 70 of the sound augmentation system 40 and at least one performance threshold level, and initiates the alert 68 upon determining that the difference is at a predetermined level.

A number of thresholds 74 can be defined for performance monitoring, including at least one performance threshold level. Performance threshold levels can be defined at sound levels where an operator may notice or become concerned about the change in sound level in the vehicle 10 of FIG. 1. The current performance level 70, boundary maps 72, and thresholds 74 may be stored along with generalized maps 76 in local storage 78. The sound augmentation system health monitor 42 may develop the boundary maps 72 based on the level of the at least one audio input 24 relative to one or more of the environmental conditions 56 and thresholds 74. The boundary maps 72 can indicate deviations in the current performance level 70 that may be acceptable or trigger a particular action or the alert 68 at a predetermined level. Depending upon implementation, the predetermined level can be less than a minimum level or greater than a maximum level. For example, the predetermined level can be defined as at or above a sound level where an adjustment should be attempted when monitoring for sound reduction due to undesired noise cancellation performance. The predetermined level can be defined as at or below a sound level where an adjustment should be attempted when monitoring for sound enhancement due to a lower level of additional sound than desired.

The generalized maps 76 may include a combination of a generalized sound augmentation system-on map 80 defining expected normal levels of performance relative to one or more of the environmental conditions 56 when the sound augmentation system 40 is active and a generalized sound augmentation system-off map 82 defining expected normal levels of performance relative to one or more of the environmental conditions 56 when the sound augmentation system 40 is inactive. The generalized sound augmentation system-on map 80 and the generalized sound augmentation system-off map 82 can be defined for the vehicle 10 of FIG. 1 and stored in the data storage device 32 as expected normal values between which the current performance level 70 may deviate. The boundary maps 72 can be defined at levels between the generalized sound augmentation system-on map 80 and the generalized sound augmentation system-off map 82.

The sound augmentation system health monitor 42 may also include a history buffer 84 to store past values 86 of the current performance level 70 and a statistically characterized performance level 88 of the current performance level 70 over a period of time as reflected in the past values 86 stored in the history buffer 84. The statistically characterized performance level 88 can be a moving average, a weighted moving average, or other statistical function to characterize performance over time. As monitoring is regularly performed and new instances of the current performance level 70 are determined, an older instance of the current performance level 70 can be transferred to the past values 86 and the statistically characterized performance level 88 updated. The monitoring logic 64 of the sound augmentation system health monitor 42 can repeatedly monitor the current performance level 70 of the sound augmentation system 40 and initiate an adjustment of the augmented audio output 52 by the adjustment logic 62 to shift the current performance level 70 closer to the expected normal levels of performance relative to the one or more environmental conditions 56 as defined in the generalized sound augmentation system-on map 80. The adjustment of the augmented audio output 52 can be triggered based on the statistically characterized performance level 88 of the sound augmentation system 40 over a period of time. Alternatively or additionally, the adjustment of the augmented audio output 52 by the adjustment module 62 can be triggered based on the current performance level 70 of the sound augmentation system 40 meeting an adjustment threshold defined relative to one or more of the boundary maps 72, where the adjustment threshold is defined in the thresholds 74.

While the example of FIG. 2 is described relative to one audio channel 44, each of the audio channels 44 can operate in parallel within the vehicle 10 of FIG. 1. Accordingly, separate instances of the augmented audio output 52 are defined for each audio output 19. A single instance or separate instances of the sound augmentation system health monitor 42 operate in parallel on each of the separate instances of the augmented audio output 52, and separate instances of the alert 68 are defined for each of the audio outputs 19. Therefore, an undesired condition can be more reliably identified as associated with a particular component. In an embodiment, a single instance of an undesired condition may result in disabling all sound augmentation performed by the audio system 18. However, in some embodiments accommodation of smaller variations can be achieved through adjusting the learned audio tuning parameters 60 for a single audio output 19 on a pairing 28 basis. Where no short-circuit or open-circuit faults exist 28 and gain and phase adjustments attempted by the adjustment module 62 do not adequately shift the current performance level 70, an alert 68 may be generated.

Figure 3A:
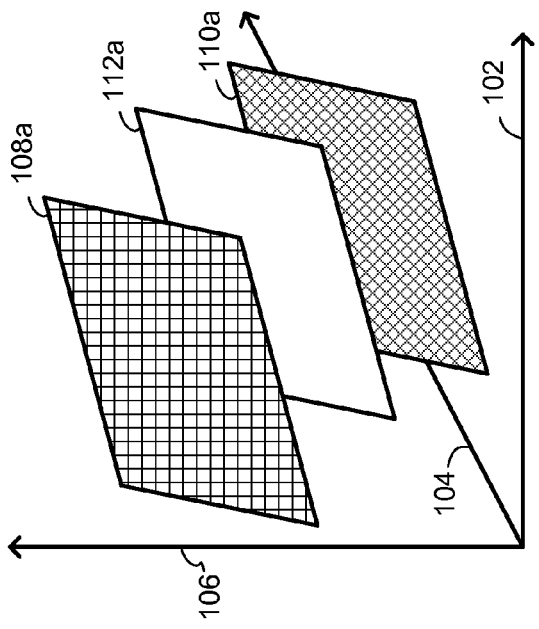
FIG. 3A is an example depiction of various maps for sound reduction in accordance with an exemplary embodiment.

FIG. 3A is an example depiction of various maps for sound reduction in accordance with an exemplary embodiment. In the example of FIG. 3A, three dimensions are depicted which represent a first environmental condition 102, a second environmental condition 104, and a level 106. In the context of the vehicle 10 of FIG. 1, the first environmental condition 102 can be an engine speed and the second environmental condition 104 can be an engine torque. The level 106 is a sound level that may be expressed in terms of decibels (dB), voltage, or other known units. In the example of FIG. 3A, a generalized sound augmentation system-off map 108a, a generalized sound augmentation system-on map 110a, and a current performance level 112a of the sound augmentation system 40 of FIG. 2 are depicted as levels relative to the first and second environmental conditions 102 and 104. The generalized sound augmentation system-off map 108a, the generalized sound augmentation system-on map 110a, and the current performance level 112a are examples of portions of the generalized sound augmentation system-off map 82, the generalized sound augmentation system-on map 80, and the current performance level 70 of FIG. 2 in one embodiment. The generalized sound augmentation system-off map 108a, the generalized sound augmentation system-on map 110a, and the current performance level 112a may be surface or contour maps with variations in the level 106 relative to the first and second environmental conditions 102 and 104. The overall shape of the generalized sound augmentation system-off map 108a, the generalized sound augmentation system-on map 110a, and the current performance level 112a can vary depending on selected environmental condition combinations. Varying levels of map complexity can be achieved depending on the number of environmental conditions included. While the example of FIG. 3A depicts two environmental conditions 102, 104, a single environmental condition can be included or a greater number of environmental conditions can be included.

FIG. 3A is an example for a sound reduction system, such as active noise cancellation, where normal operation is expected to reduce the level 106 of sound. As can be seen in the relative difference between the generalized sound augmentation system-off map 108a and the generalized sound augmentation system-on map 110a, a higher level 106 of noise may be expected when the sound augmentation system 40 of FIG. 2 is inactive (system-off). Ideally, the current performance level 112a should substantially align with the generalized sound augmentation system-on map 110a when the sound augmentation system 40 of FIG. 2 is active (system-on). Differences between the current performance level 112a and the generalized sound augmentation system-on map 110a may be attributable to component aging or degradation. Exemplary embodiments quantify and analyze the current performance level 112a relative to at least one performance threshold level (e.g., a greater noise level relative to the generalized sound augmentation system-on map 110a) and initiate the alert 68 of FIG. 2 upon determining that a difference between the current performance level 112a and at least one performance threshold level is at a predetermined level. The same or additional thresholds can also be used to initiate an adjustment of the augmented audio output 52 of FIG. 2 to shift the current performance level 112a closer to the expected normal levels of performance relative to the first and second environmental conditions 102, 104 as defined in the generalized sound augmentation system-on map 110a.

Figure 3B:
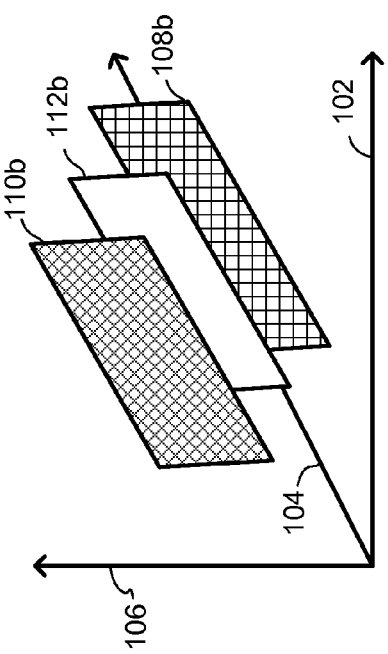
FIG. 3B is an example depiction of various maps for sound enhancement in accordance with an exemplary embodiment.

FIG. 3B is an example depiction of various maps for sound enhancement in accordance with an exemplary embodiment. Similar to FIG. 3A, FIG. 3B depicts a three dimensional example including the first environmental condition 102, the second environmental condition 104, and level 106. In the example of FIG. 3B, a generalized sound augmentation system-off map 108b, a generalized sound augmentation system-on map 110b, and a current performance level 112b of the sound augmentation system 40 of FIG. 2 are depicted as levels relative to the first and second environmental conditions 102 and 104. The generalized sound augmentation system-off map 108b, the generalized sound augmentation system-on map 110b, and the current performance level 112b are examples of portions of the generalized sound augmentation system-off map 82, the generalized sound augmentation system-on map 80, and the current performance level 70 of FIG. 2 in one embodiment. The generalized sound augmentation system-off map 108b, the generalized sound augmentation system-on map 110b, and the current performance level 112b may be surface or contour maps with variations in the level 106 relative to the first and second environmental conditions 102 and 104. The overall shape of the generalized sound augmentation system-off map 108b, the generalized sound augmentation system-on map 110b, and the current performance level 112b can vary depending on selected environmental condition combinations. Varying levels of map complexity can be achieved depending on the number of environmental conditions included. While the example of FIG. 3B depicts two environmental conditions 102, 104, a single environmental condition can be included or a greater number of environmental conditions can be included.

FIG. 3B is an example for a sound enhancement system, such as an engine sound enhancement system, where normal operation is expected to increase the level 106 of sound. As can be seen in the relative difference between the generalized sound augmentation system-off map 108b and the generalized sound augmentation system-on map 110b, a lower level 106 of noise may be expected when the sound augmentation system 40 of FIG. 2 is inactive (system-off). Ideally, the current performance level 112b should substantially align with the generalized sound augmentation system-on map 110b when the sound augmentation system 40 of FIG. 2 is active (system-on). Differences between the current performance level 112b and the generalized sound augmentation system-on map 110b may be attributable to component aging or degradation. Exemplary embodiments quantify and analyze the current performance level 112b relative to at least one performance threshold level (e.g., a lower sound level relative to the generalized sound augmentation system-on map 110b) and initiate the alert 68 of FIG. 2 upon determining that a difference between the current performance level 112b and at least one performance threshold level is at a predetermined level. The same or additional thresholds can also be used to initiate an adjustment of the augmented audio output 52 of FIG. 2 to shift the current performance level 112b closer to the expected normal levels of performance relative to the first and second environmental conditions 102, 104 as defined in the generalized sound augmentation system-on map 110b.

As can be appreciated, systems that include both noise reduction and sound enhancement operate upon different frequencies of interest. Therefore, the generalized sound augmentation system-off map 108a, the generalized sound augmentation system-on map 110a, and the current performance level 112a can be defined relative to a first frequency or set of frequencies, while the generalized sound augmentation system-off map 108b, the generalized sound augmentation system-on map 110b, and the current performance level 112b can be defined relative to a second frequency or set of frequencies. As frequency content to be reduced differs from frequency content to be enhanced, adjustment of the learned audio tuning parameters 60 of FIG. 2 can modify phase and increase gain for certain frequencies while decreasing gain for other frequencies.

Figure 4:
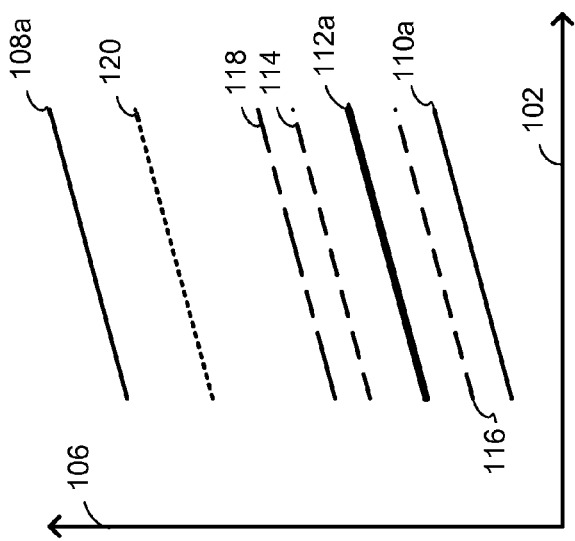
FIG. 4 is an example depiction of various thresholds for sound reduction in accordance with an exemplary embodiment.

FIG. 4 is an example depiction of various thresholds for sound reduction in accordance with an exemplary embodiment. The example of FIG. 4 is provided relative to a sound reduction embodiment, such as that of FIG. 3A. Similar principles can be applied for a sound enhancement system, such as that of FIG. 3B. FIG. 4 depicts the level 106 relative to the first environmental condition 102 of FIG. 3A in a two-dimensional format for ease of explanation. In addition to the generalized sound augmentation system-off map 108a, the generalized sound augmentation system-on map 110a, and the current performance level 112a of FIG. 3A, FIG. 4 also depicts a two-dimensional example of boundary maps 114 and 116. The boundary maps 114 and 116 are examples of portions of the boundary maps 72 of FIG. 2, and may include additional dimensions, e.g., relative to the second environmental condition 104 of FIG. 3A. An adjustment threshold 118 may be defined relative to one or more of the boundary maps 114, 116. The boundary maps 114 and 116 can define an expected normal range of deviation for the current performance level 112a. Shifting the adjustment threshold 118 away from the boundary maps 114 and 116 can provide an additional degree of margin for noise or anomalies. While only one instance of the adjustment threshold 118 is depicted in FIG. 4, other instances of the adjustment threshold 118 can be defined, for instance, to separately specify upward and downward adjustment thresholds. As one example, the adjustment threshold 118 can be defined as three dB greater than boundary map 114 and/or three dB less (not depicted) than boundary map 116. The adjustment threshold 118 can be stored in the thresholds 74 of FIG. 2.

FIG. 4 also includes an example of a fault threshold 120. If the current performance level 112a meets (e.g., at or above) the fault threshold 120, this may indicate a fault condition where further actions are needed. The fault threshold 120 may be checked before the adjustment threshold 118 such that the sound augmentation system 40 of FIG. 2 can be disabled rapidly upon an undesired condition rather than triggering an adjustment. Both the adjustment threshold 118 and the fault threshold 120 are examples of performance threshold levels that can trigger the alert 68 of FIG. 2 and result in different actions. The alert 68 can be specified as a type of alert, a severity level, and identify a component potentially performing in an undesired manner. For instance, when an adjustment is initiated, the alert 68 can indicate which pairing 28 of FIG. 1 is being adjusted, and this information can be retained as health history for the vehicle 10 of FIG. 1 to assist in future diagnostic and monitoring actions but need not be directly conveyed to occupants of the vehicle 10. In contrast, an undesired condition that results in deactivation of sound augmentation for the vehicle 10 of FIG. 1 may result in an instance of the alert 68 of FIG. 2 that is displayed on the user interface 36 of FIG. 1 such that occupants of the vehicle 10 can understand why the sound profile of the vehicle 10 of FIG. 1 has changed.

Figure 5:
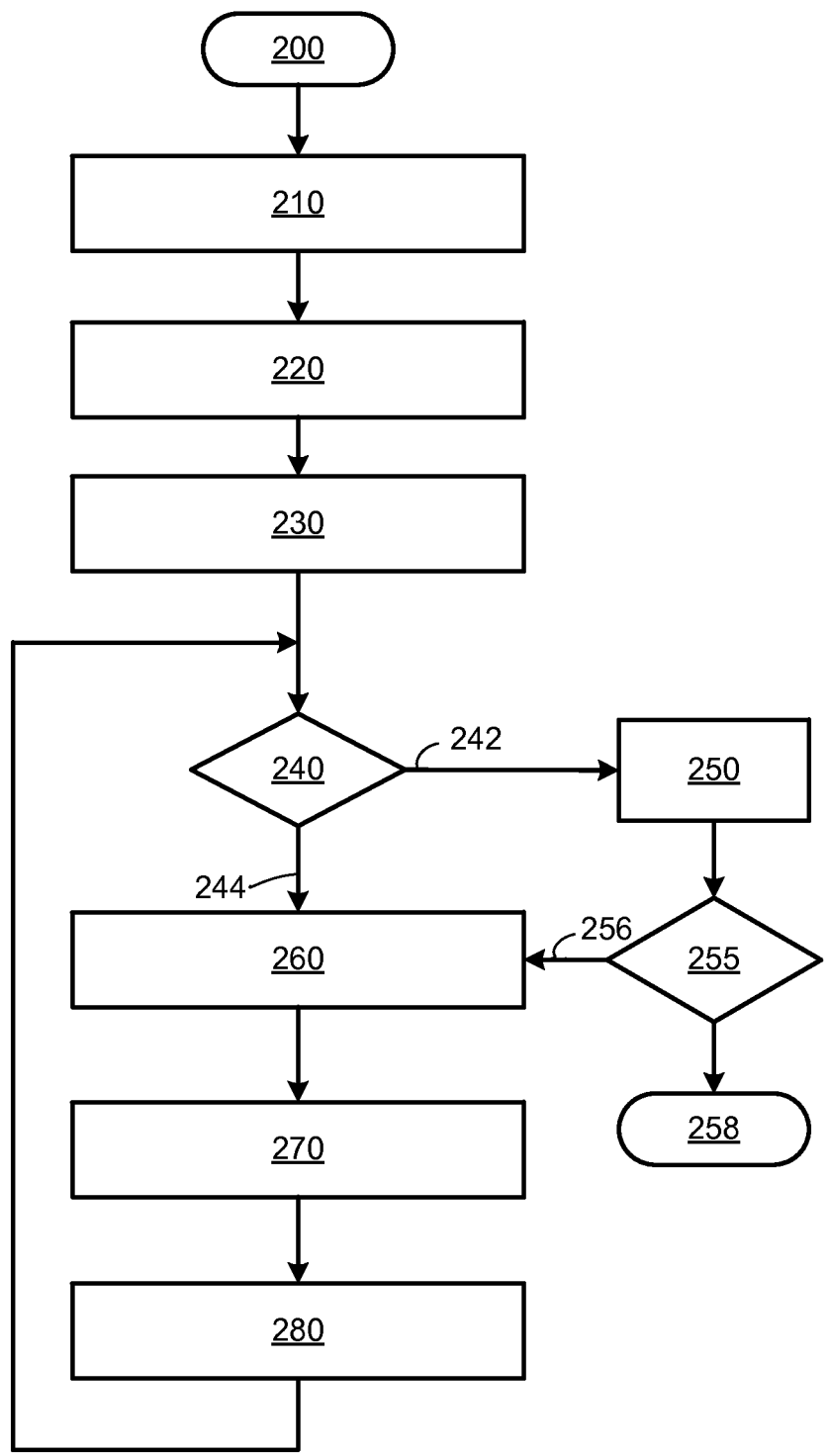
FIG. 5 is a flowchart illustrating a method in accordance with an exemplary embodiment.

Referring now to FIG. 5, and with continued reference to FIGS. 1-4, a flowchart illustrates sound augmentation system performance health monitoring methods that can be performed in the vehicle system 12 in accordance with the present disclosure. As can be appreciated in light of the disclosure, the order of operations within the method is not limited to the sequential execution as illustrated in FIG. 5, but may be performed in one or more varying orders as applicable and in accordance with the present disclosure. As can further be appreciated, one or more steps may be added or removed without altering the spirit of the method.

In one example, the method may begin at 200. At 210, the sound augmentation generator 46 of the sound augmentation system 40 produces an augmented audio output 52 to drive at least one audio output 19 based at least in part on a transfer function 30, one or more environmental conditions 56, and a plurality of audio tuning parameters 58. As previously described, the sound augmentation system 40 can be coupled to one or more inputs such as audio input 24, and the transfer function 30 may be defined based on a pairing 28 of one audio output 19 with one audio input 24. A feedback 66 of the augmented audio output 52 is compared to a level of at least one input, such as audio input 24 or audio output feedback 22, relative to one or more of the environmental conditions 56 to determine a current performance level 70 of the sound augmentation system 40. As the vehicle 10 is driven over a number of miles and a period of time (e.g., a number of months), the sound augmentation health monitor 42 monitors a level of sound relative to one or more environmental conditions 56 to observe the current performance level 70 and develops boundary maps 72. The boundary maps 72 can be developed based on the level of at least one input (e.g., audio input 24 or the audio output feedback 22) relative to one or more of the environmental conditions 56 and a plurality of thresholds 74.

At 220, the boundary maps 72 are combined with the generalized sound augmentation system-on map 80 and the generalized sound augmentation system-off map 82, where the boundary maps 72 are defined at levels between the generalized sound augmentation system-on map 80 and the generalized sound augmentation system-off map 82. Various thresholds 74 can also be defined relative to the boundary maps 72, the generalized sound augmentation system-on map 80, and the generalized sound augmentation system-off map 82.

At 230, an initial fault and adjustment check of the sound augmentation system 40 is performed. Various high-level tests can include open-circuit and short-circuit tests of the speakers 20, microphones 26, and amplifier 48. The sound augmentation health monitor 42 can also determine a difference between the current performance level 70 of the sound augmentation system 40 and at least one performance threshold level, such as the adjustment threshold 118 and/or the fault threshold 120.

At 240, if testing indicates that an undesired condition exists or an adjustment is needed, then path 242 is taken to 250; otherwise, path 244 is taken to 260. For instance, path 242 is taken upon determining that the difference between the current performance level 70 and the at least one performance threshold level is at a predetermined level where an alert 68 should be initiated. At 250, the alert 68 is initiated. The alert 68 indicates an undesired condition, an adjustment, or other system status information. Separate instances of the alert 68 may be defined for each audio output 19. At 255, if an adjustment is needed and a fault does not exist, path 256 can be taken to 260; otherwise, the method ends at 258. Upon an undesired condition, the sound augmentation system 40 can be disabled and a corresponding message can be relayed with supporting diagnostic information to the vehicle health monitor 34 and user interface 36.

At 260, the sound augmentation health monitor 42 continues to monitor the current performance level 70. As the current performance level 70 changes slowly over time, the boundary maps 72 may shift. Depending upon the implementation, the adjustment threshold 118 may also shift over time along with the boundary maps 72. For instance, as the current performance level 70 moves closer to the generalized sound augmentation system-on map 80, the adjustment threshold 118 can be reduced to incrementally shift the current performance level 70 towards the generalized sound augmentation system-on map 80.

At 270, the sound augmentation health monitor 42 can initiate an adjustment of the augmented audio output 52 to shift the current performance level 70 closer to the expected normal levels of performance relative to the one or more environmental conditions 56 as defined in the generalized sound augmentation system-on map 80. The adjustment of the augmented audio output 52 can be triggered based on the current performance level 70 of the sound augmentation system 40 meeting the adjustment threshold 118 defined relative to one or more of the boundary maps 72. The adjustment can be managed by the adjustment module 62 to modify the learned audio tuning parameters 60.

At 280, the current performance level 70 may be buffered in the history buffer 84 to store past values 86 of the current performance level 70 and a statistically characterized performance level 88. A separate instance of the adjustment threshold 118 can be defined for the statistically characterized performance level 88 to trigger an adjustment on a slower moving trend of reduced performance. In one embodiment, adjustment of the augmented audio output 52 is triggered based on the statistically characterized performance level 88 of the sound augmentation system 40 over a period of time. The method of FIG. 5 can loop back to 240 and continue determining whether a fault exists or an adjustment is needed.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A vehicle system, comprising:
a sound augmentation system comprising a sound augmentation generator coupled to at least one audio output, the sound augmentation generator produces an augmented audio output to drive the at least one audio output based on a transfer function and a plurality of audio tuning parameters; and
a sound augmentation system health monitor coupled to at least one input and a feedback of the augmented audio output, the sound augmentation system health monitor compares the feedback of the augmented audio output to a level of the at least one input relative to at least one environmental condition to determine a current performance level of the sound augmentation system, determines a difference between the current performance level of the sound augmentation system and at least one performance threshold level, and initiates an alert upon determining that the difference is at a predetermined level, wherein the sound augmentation system health monitor develops a plurality of boundary maps based on the level of the at least one input relative to the at least one environmental condition and a plurality of thresholds, and the plurality of boundary maps are combined with a generalized sound augmentation system-on map defining expected normal levels of performance relative to the at least one environmental condition when the sound augmentation system is active and a generalized sound augmentation system-off map defining expected normal levels of performance relative to the at least one environmental condition when the sound augmentation system is inactive, and further wherein the boundary maps are defined at levels between the generalized sound augmentation system-on map and the generalized sound augmentation system-off map.

2. The vehicle system of claim 1, wherein the at least one input comprises at least one audio input, the sound augmentation system is coupled to the at least one audio input, and the transfer function is defined based on a pairing of one of the at least one audio output with one of the at least one audio input.

3. The vehicle system of claim 2, wherein the sound augmentation system health monitor repeatedly monitors the current performance level of the sound augmentation system and initiates an adjustment of the augmented audio output by changing one or more of the audio tuning parameters to shift the current performance level closer to the expected normal levels of performance relative to the at least one environmental condition as defined in the generalized sound augmentation system-on map.

4. The vehicle system of claim 3, wherein the adjustment of the augmented audio output is triggered based on a statistically characterized performance level of the sound augmentation system over a period of time.

5. The vehicle system of claim 3, wherein the adjustment of the augmented audio output is triggered based on the current performance level of the sound augmentation system meeting an adjustment threshold defined relative to one or more of the boundary maps.

6. The vehicle system of claim 1, wherein the at least one environmental condition comprises one or more vehicle conditions received from one or more modules of the vehicle system, and further wherein separate instances of the augmented audio output are defined for each audio output of the at least one audio output, the sound augmentation system health monitor operates in parallel on each of the separate instances of the augmented audio output, and separate instances of the alert are defined for each of the at least one audio output.

7. A method of sound augmentation system performance health monitoring in a vehicle, the method comprising:
producing, by a sound augmentation generator of a sound augmentation system, an augmented audio output to drive at least one audio output in the vehicle based on a transfer function and a plurality of audio tuning parameters;
comparing a feedback of the augmented audio output to a level of at least one input relative to at least one environmental condition to determine a current performance level of the sound augmentation system;
developing a plurality of boundary maps based on the level of the at least one input relative to the at least one environmental condition and a plurality of thresholds;
combining the boundary maps with a generalized sound augmentation system-on map defining expected normal levels of performance relative to the at least one environmental condition when the sound augmentation system is active and a generalized sound augmentation system-off map defining expected normal levels of performance relative to the at least one environmental condition when the sound augmentation system is inactive, wherein the boundary maps are defined at levels between the generalized sound augmentation system-on map and the generalized sound augmentation system-off map;

determining a difference between the current performance level of the sound augmentation system and at least one performance threshold level; and initiating an alert upon determining that the difference is at a predetermined level.

8. The method of claim 7, wherein the at least one input comprises at least one audio input, the sound augmentation system is coupled to the at least one audio input and the transfer function is defined based on a pairing of one of the at least one audio output with one of the at least one audio input.

9. The method of claim 7, further comprising:
monitoring the current performance level of the sound augmentation system; and initiating an adjustment of the augmented audio output by changing one or more of the audio tuning parameters to shift the current performance level closer to the expected normal levels of performance relative to the at least one environmental condition as defined in the generalized sound augmentation system-on map.

10. The method of claim 9, further comprising:
triggering the adjustment of the augmented audio output based on a statistically characterized performance level of the sound augmentation system over a period of time.

11. The method of claim 9, further comprising:
triggering the adjustment of the augmented audio output based on the current performance level of the sound augmentation system meeting an adjustment threshold defined relative to one or more of the boundary maps.

12. The method of claim 7, wherein the at least one environmental condition comprises one or more vehicle conditions received from one or more modules of the vehicle, and further wherein separate instances of the augmented audio output are defined for each audio output of the at least one audio output, separate instances of the alert are defined for each of the at least one audio output and further comprising:
performing sound augmentation system health monitoring in parallel on each of the separate instances of the augmented audio output.

13. A vehicle, comprising:
at least one audio output;
at least one input comprising one or more of: at least one audio input from one or more microphones and at least one feedback of the at least one audio output from one or more speakers;

a sound augmentation system comprising a sound augmentation generator coupled to the at least one audio output, the sound augmentation generator produces an augmented audio output to drive the at least one audio output based on a transfer function and a plurality of audio tuning parameters; and a sound augmentation system health monitor coupled to the at least one input and a feedback of the augmented audio output, the sound augmentation system health monitor compares the feedback of the augmented audio output to a level of the at least one input relative to at least one vehicle condition to determine a current performance level of the sound augmentation system, determines a difference between the current performance level of the sound augmentation system and at least one performance threshold level, and initiates an alert upon determining that the difference is at a predetermined level, wherein the sound augmentation system health monitor develops a plurality of boundary maps based on the level of the at least one input relative to the at least one vehicle condition and a plurality of thresholds, the plurality of boundary maps are combined with a generalized sound augmentation system-on map defining expected normal levels of performance relative to the at least one vehicle condition when the sound augmentation system is active and a generalized sound augmentation system-off map defining expected normal levels of performance relative to the at least one vehicle condition when the sound augmentation system is inactive, and further wherein the boundary maps are defined at levels between the generalized sound augmentation system-on map and the generalized sound augmentation system-off map.

14. The vehicle of claim 13, wherein the sound augmentation system health monitor repeatedly monitors the current performance level of the sound augmentation system and initiates an adjustment of the augmented audio output by changing one or more of the audio tuning parameters to shift the current performance level closer to the expected normal levels of performance relative to the at least one vehicle condition as defined in the generalized sound augmentation system-on map.

15. The vehicle of claim 13, wherein separate instances of the augmented audio output are defined for each audio output of the at least one audio output, the sound augmentation system health monitor operates in parallel on each of the separate instances of the augmented audio output, and separate instances of the alert are defined for each of the at least one audio output.

* * * * *